United States Patent
Robba et al.

(10) Patent No.: US 10,885,174 B2
(45) Date of Patent: Jan. 5, 2021

(54) IOT-ENABLED DEVICE AND A METHOD FOR MANUFACTURING AN IOT DEVICE

(71) Applicant: ADVANCED DIGITAL BROADCAST S.A., Eysins (CH)

(72) Inventors: Mauro Robba, Milan (IT); Marco Storto, Milan (IT)

(73) Assignee: ADVANCED DIGITAL BROADCAST S.A, Bellevue (CH)

( * ) Notice: Subject to any disclaimer, the term of this patent is extended or adjusted under 35 U.S.C. 154(b) by 360 days.

(21) Appl. No.: 15/607,536

(22) Filed: May 29, 2017

(65) Prior Publication Data

US 2017/0347223 A1 Nov. 30, 2017

(30) Foreign Application Priority Data

May 31, 2016 (EP) .................................... 16172253

(51) Int. Cl.
*G06F 21/33* (2013.01)
*H04W 12/06* (2009.01)
*H04W 4/70* (2018.01)
*H04W 12/04* (2009.01)
*G06F 21/44* (2013.01)
*H04L 29/06* (2006.01)

(52) U.S. Cl.
CPC ............ *G06F 21/33* (2013.01); *G06F 21/445* (2013.01); *H04L 63/0823* (2013.01); *H04W 4/70* (2018.02); *H04W 12/04031* (2019.01); *H04W 12/06* (2013.01)

(58) Field of Classification Search
CPC ............... G06F 21/33; G06F 21/445; H04W 12/04031; H04W 4/70; H04W 12/06; H04L 63/0823
See application file for complete search history.

(56) References Cited

U.S. PATENT DOCUMENTS

2006/0156054 A1* 7/2006 Brown .................... H04L 41/00
714/4.1
2007/0043682 A1* 2/2007 Drapkin ............. G06Q 20/3829
705/71

(Continued)

*Primary Examiner* — Austin J Moreau
(74) *Attorney, Agent, or Firm* — Mark M. Friedman

(57) ABSTRACT

A method for providing an IoT functionality to a device, the method comprising manufacturing the device by: providing a connectivity module with a register comprising data related to machine-to-machine (M2M) credentials and comprising: a unique client identifier (Client ID), an authentication identifier (Authentication ID) related to a unique pair of public/private encryption keys, a wireless client access point identifier (miniAP SSID) and a wireless encryption key (miniAP WPA, WPA2); providing a non-electronic label associated with the connectivity module and comprising the wireless client access point Identifier (miniAP SSID) and the wireless encryption key (miniAP WPA, WPA2); providing an electronic module having a device serial number (Device ID S/N); providing a non-electronic label associated with the electronic module and comprising an activation code unique for the device; assembling the device by connecting the electronic module with the connectivity module; and providing a package comprising the device and the non-electronic labels.

8 Claims, 10 Drawing Sheets

(56) References Cited

U.S. PATENT DOCUMENTS

| | | | |
|---|---|---|---|
| 2015/0172061 A1* | 6/2015 | Lee | H04W 12/04 |
| | | | 713/176 |
| 2015/0222621 A1 | 8/2015 | Baum et al. | |
| 2015/0245281 A1* | 8/2015 | Beguin | H04W 48/16 |
| | | | 370/255 |
| 2015/0302738 A1 | 10/2015 | Geerlings | |
| 2016/0033437 A1* | 2/2016 | Anjum | A01G 22/00 |
| | | | 324/664 |
| 2017/0347223 A1* | 11/2017 | Robba | H04W 4/70 |
| 2018/0176771 A1* | 6/2018 | Yang | H04L 9/0819 |

\* cited by examiner

IOT-ENABLED DEVICE AND A METHOD FOR MANUFACTURING AN IOT DEVICE

TECHNICAL FIELD

The present invention is related to providing communication over the Internet.

BACKGROUND

The Internet of Things (IoT) is a term that is described by the International Telecommunications Union (ITU) as a network of "things", i.e. physical objects, such as devices, vehicles, buildings and other items—embedded with electronics, software, sensors, and network connectivity that enables these objects to collect and exchange data. Throughout this disclosure, these physical objects within the IoT network will be called "devices".

This disclosure relates in particular to devices such as appliances, consumer electronic devices, commercial electronic devices etc. that are not able to natively communicate in the Internet due to the fact that they do not have by nature any IP connection capability. There is a need to provide such devices with some means of connectivity, so that they can communicate within the environment of the Internet of Things.

This disclosure relates in particular to electronic devices that comprise a legacy electronic module, such as a module comprising a main control unit and a user interface unit or a service port, but which lack hardware and software connectivity capabilities.

To provide such devices with connectivity capabilities, it is a known solution, as shown in FIG. 1, to supplement the device 110 with an additional component to the structure of the device 110, for example an add-on connectivity module 120, with add-on hardware and software capabilities for connecting the device 110 to the Internet 130. Usually, the connectivity module 120 is a custom hardware and software module, specifically designed for communicating with the legacy electronic module 111 of the device 110, such as with its main control unit 112 and/or its communication interface, such as a user interface or service port 113 and the connectivity module 120 needs to know the device data-model and its data protocol 121. Moreover, the legacy electronic module 111 may require some hardware and software re-designs/modifications, for being able to exchange the data with the connectivity module 120 using the appropriate interface and the appropriate data-model/data-protocol 121 and then over the Internet with its back-end entities. Every device has its specific electronics interfaces and its specific data-model, therefore ad-hoc electronic signals and data-model must be implemented accordingly in hardware and software modes on the connectivity module 120.

Then, once the legacy device 110 is connected to the Internet by means of the add-on connectivity module 120, the legacy device 110 must connect to a back-end server(s) 160 and be initially authenticated by a machine-to-machine (M2M) back-end server 140 (for setting up the M2M connection, authentication and security) and then must be identified by the application enablement back-end server 150 such as the device vendor cloud server and/or the user device control application 171 (such as mobile or web application) operated by an end-user device, such as a smartphone 170.

This first connection with the M2M and application enablement back-end server is usually called activation procedure of a new connected device. It is common that the M2M back-end server 140 and authentication connection is based on unique device M2M credentials 126, 141, such as a unique physical client ID, in order to establish the M2M connection and a unique authentication ID, such as a pair of username/password or a unique client certificate in order for the device 110 to be authenticated by the M2M back-end server 140. Then, it is common that the connection with the application enablement back-end server 150 (the server entity that has to recognize the remote device unit and to control the device and to send/receive data with it) is based on a device serial number identifier (S/N ID) 125, 151 that is a unique production ID, identifying the device vendor, category, model and production unit.

Usually, the device S/N ID 125 has a factory/production code format, such as a long string of numbers or hexadecimal or alphanumeric characters, generated in consecutive incremental values and without any string consistency checksum.

Sometimes, for a consumer application, where a device control mobile application 171 for the user is involved, an activation code 115 is also used. The activation code 115 is another unique production ID code of the device 110 and it can also identify the specific production unit, model and vendor. It can work on behalf of the device ID S/N with 1:1 relation for uniquely pairing the device 110 with the user device control mobile application 171. However, the activation code 115 is a more user-friendly code of the device 110. It is usually a string of characters that is easy to digit/input by the user and with a CRC check sum in order to assist the user in inserting correctly the code in the on-board wizard of the device control mobile application 171. The activation code 115 is usually not an electronic ID stored on a register of the device electronic module 111 or of the connectivity module 120, but it is usually a printed label and paired to the device 110 during the device assembly in factory. The label is usually attached to the device 110 chassis for easy visualization to the user, such as at the front panel of a device.

Usually, the device M2M credentials 126 are stored in some electronic register on the connectivity module 120. The device S/N ID 125 can be stored in some electronic register of the legacy electronic module 111 (if it is redesigned for that), but usually it is also stored on an electronic register of the connectivity module 120. The activation code 115 is usually printed and attached as a string label or a QR code label for easy user visualization, such as at the front panel of the device.

In terms of manufacturing procedures of the connected device model with its add-on connectivity module, usually the custom connectivity module is pre-produced with its hardware and software custom release in a connectivity module production factory and then the Connectivity module is later assembled with the device in the device production factory.

The solution described with reference to FIG. 1 has several drawbacks.

In order to enable Internet connectivity for the legacy device 110, it is required to add ad-hoc hardware/software capabilities that usually take the form of the add-on connectivity module 120 able to talk with the legacy electronic module 111 of the device, get its appropriate data messages and send/receive to/from the back-end entities. The legacy device electronic module 111 needs to expose the appropriate data messages through an ad-hoc physical communication port towards the connectivity module. This may require a partial or total hardware redesign of the legacy electronic module 111, such as adding ad-hoc new hardware communication components and connectors 124 on the main control unit module 112 or on the user interface/service port module 113. Moreover, specific software capabilities must be added to the device electronic module 111 (on the control unit module 112 or to the user interface/service port module 113) for being able to expose the appropriate device data (e.g. to send/receive the appropriate data message) with the appropriate data-model and data-protocol. Also, it is usual that specific new data information must be stored on-board on the device electronic module 111 in the form of software register, such as storing the device S/N 125 for unique identification of the device production ID (identifying the vendor, category, model and production unit) needed for device authentication with the application enablement back-end 150 (the server entity that has to recognize the remote device unit and to control the device and send/receive data with).

Moreover, the connectivity module 120 must be custom designed in hardware/software features for being able to communicate with the legacy device 110. The connectivity module 120 needs to have specific hardware features 123 for the physical connectivity with the legacy device 110 and specific software features for being able to manage the specific data protocol and the data-model of the legacy device.

Moreover, the connectivity module 120 usually needs to store on-board the device M2M credentials 126 (such as the client ID and the username/password or certificates client credentials for the M2M back-end authentication), as well as the device S/N 125 if it is not stored on the device electronic module 111.

In addition, the structure of FIG. 1 has several drawbacks related to complex manufacturing and repair procedures. Manufacturing process problems include complicated manufacturing procedures of the connectivity module 120, as well as the assembly procedures of the legacy device with the connectivity module 120.

It is common that the manufacturing process involves a series of the following steps to be performed at two distinct factories (manufacturing sites).

Steps Performed in a First Factory May Include:
1.a physical manufacturing of the connectivity module 120;
1.b electronic burning onboard of the device M2M credentials 126 (client ID and username/password or certificates) on an ad-hoc electronic registers of the connectivity module 120;
1.c saving and storing of all the produced device M2M credentials in ad-hoc M2M IDs inventory database;
1.d transfer of the M2M IDs inventory database of the first factory in the vendor system back-end for provisioning the M2M authentication inventory database in the cloud.

Steps Performed in a Second Factory May Include:
2.a physical assembly of the connectivity module 120 on the device layout;
2.b electronic burning of the device S/N ID 125 in an ad-hoc electronic register of the connectivity module 120 or inside the device electronic module 111 configured to host the electronic device S/N 125 and able to communicate it to the connectivity module 120 and/or to the application enablement back-end server 150;
2.c saving and storing of all the produced device S/N IDs in an ad-hoc device S/N IDs inventory database;
2.d transfer of the device S/N IDs inventory database of the second factory to the Vendor system back-end for provisioning the application enablement authentication inventory database in the cloud;
2.e printing of a user-friendly activation code label or a QR code label and attaching it to the device chassis (front panel) for user mobile application on-boarding.

These procedures require to perform specific and complex manufacturing steps, such as probing many times the connectivity module 120 and/or the device electronic module 111 with specific tools (such as in-factory computer and connector cabling) for burning the IDs (device M2M credentials 126 and device S/N IDs 125) and transfer all these IDs inventories toward the cloud systems.

Then, the cloud systems must properly manage the inventory database of the IDs in order to complete the M2M and application enablement authentication and activation procedures at the back-end side.

Therefore, there is a need to improve the structure of the devices for use in an IoT environment, in order to at least improve the situation related to at least one of the problems of: limiting the need for redesign of the legacy electronic module, limiting the need for customization of the connectivity module, simplifying the connectivity module manufacturing, simplifying the device assembly procedures, simplifying the IDs Inventories provisioning on the back-end side.

SUMMARY

In order to solve at least the problem of simplifying the connectivity module manufacturing, there is disclosed a method for providing an IoT functionality to a device, the method comprising manufacturing the device by: providing a connectivity module with a register comprising data related to machine-to-machine credentials and comprising: a unique client identifier (Client ID), an authentication identifier (Authentication ID) related to a unique pair of public/private encryption keys, a wireless client access point identifier (miniAP SSID) and a wireless encryption key (miniAP WPA, WPA2); providing a non-electronic label associated with the connectivity module and comprising the wireless client access point identifier (miniAP SSID) and the wireless encryption key (miniAP WPA, WPA2); providing an electronic module having a device serial number (Device ID S/N); providing a non-electronic label associated with the electronic module and comprising an activation code unique for the device; assembling the device by connecting the electronic module with the connectivity module; and providing a package comprising the device and the non-electronic labels.

The method may further comprise: storing, in an activation codes inventory database at a back-end server, pairs of data related to the activation code and the associated device serial number (Device ID S/N), corresponding to the manufactured devices.

The method may further comprise initiating the operation of the device within the system by: using an application operated by the end-user device: receiving from the user the wireless client access point identifier (miniAP SSID) and the wireless encryption key (miniAP WPA, WPA2); receiving from the user the activation code; communicating with the device using the wireless client access point identifier (miniAP SSID) and the wireless encryption key (miniAP WPA, WPA2) and reading from the register of the connectivity module the client identifier (Client ID); and transmitting to the back-end server data related to the client identifier and the activation code; and at the back-end server, registering the device upon verifying the existence of the activation code in the activation codes inventory database.

The method may further comprise registering a pair of a client identifier (Client ID) and a device serial number (Device ID S/N) or activation code in an active identifiers inventory database at the back-end server.

The method may further comprise initiating the operation of the device in the Station mode, comprising receiving from the device the activation code and the client identifier (Client ID) and checking whether these identifiers are paired in the active identifiers inventory database.

Furthermore, in order to solve at least the problem of simplifying the connectivity module manufacturing, there is disclosed a device comprising: an electronic module; a connectivity module configured to provide Internet connectivity for the device via a data interface communicatively connected with electronic module; characterized in that the connectivity module comprises a register comprising data related to machine-to-machine credentials and comprising: a unique client identifier (Client ID), an authentication identifier (Authentication ID) related to a unique pair of public/private encryption keys, a wireless client access point identifier (miniAP SSID) and a wireless encryption key (miniAP WPA, WPA2); and the device further comprises a first non-electronic label comprising an activation code unique for the device and a second non-electronic label comprising the wireless client access point identifier (miniAP SSID) and the wireless encryption key (miniAP WPA, WPA2).

Furthermore, in order to solve at least the problem of simplifying the connectivity module manufacturing, there is disclosed a system comprising: at least one device as described above; and a back-end cloud server comprising: a machine-to-machine server configured to communicate with the connectivity module of the device; an application enablement server connected with the machine-to-machine server and configured to handle communication between the device and an end-user device; and an activation codes inventory database comprising pairs of data related to the activation code and the associated device serial number (Device ID S/N) of the at least one device.

The system may further comprise an active identifiers inventory database comprising pairs of a client identifier (Client ID) and a device serial number (Device ID S/N) or activation code.

Furthermore, in order to solve at least the problem of limiting the need for redesign of the legacy electronic module, there is disclosed a device comprising: an electronic module comprising a control unit communicatively connected via a communication bus with a communication interface; a connectivity module configured to provide Internet connectivity for the device via a data interface communicatively connected with electronic module; and a data proxy module connected between the data interface of the connectivity module and the communication bus for transmitting data between the data interface and the communication bus.

The data proxy module may comprise: a first sniffing module configured to read data transmitted via the communication bus from the control unit to the communication interface; a second sniffing module configured to read data transmitted via the communication bus from the communication interface to the control unit; and a multiplexer configured to multiplex data read by the first sniffing module and the second sniffing module and to transmit the multiplexed data to the data interface.

The data proxy module comprises: a first injecting module configured to transmit data via the communication bus to the control unit; a second injecting module configured to transmit data via the communication bus to the communication interface; and a demultiplexer configured to read data from the data interface and to demultiplex and transmit that data to the first injecting module and to the second injecting module.

The data interface can be a wireless interface.

Furthermore, in order to solve at least the problem of limiting the need for redesign of the legacy electronic module, there is provided a method for providing Internet connectivity to a device comprising an electronic module with a control unit communicatively connected via a communication bus with a communication interface by adding to the device a connectivity module with a data interface configured to communicate the device with the Internet; the method being characterized by: providing a data proxy module connected between the data interface of the connectivity module and the communication bus; and transmitting data between the data interface and the communication bus.

The method may comprise transmitting raw data between the data interface and the communication bus.

Moreover, in order to solve at least the problem of limiting the need for redesign of the legacy electronic module, there is provided a system comprising: at least one device as described above; and a back-end cloud server comprising: a machine-to-machine server configured to communicate with the connectivity module of the device; an application enablement server connected with the machine-to-machine server and configured to handle communication between the device and an end-user device; wherein the application enablement server comprises a data model and protocol parser configured to interpret device-specific data transmitted via the data interface.

The connectivity module may comprise a register storing machine-to-machine credentials and the machine-to-machine server comprises an authentication module for authenticating the connectivity module using the machine-to-machine credentials.

Further, in order to solve at least the problem of limiting the need for redesign of the legacy electronic module, there is provided a method for providing access from an end-user device to an IoT device as described above via a system as described above, the method comprising: in the application enablement server: identifying the model of the IoT device; and parsing data transmitted between the end-user device and the IoT device by a protocol parser depending on the identified model.

In order to solve the other problems as mentioned in this disclosure, the devices, methods and systems described above may be supplemented with additional features as disclosed herein.

BRIEF DESCRIPTION OF FIGURES

The presented method and system are shown by means of example embodiments on a drawing, wherein.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

In the present disclosure, the term "video content" is to be understood more broadly as multimedia content comprising video data and associated audio data and associated additional data (such as content description, etc.). The term "video content" is used to distinguish the content from other content types, such as still images or raw data (e.g. files).

DETAILED DESCRIPTION

Figure 2:
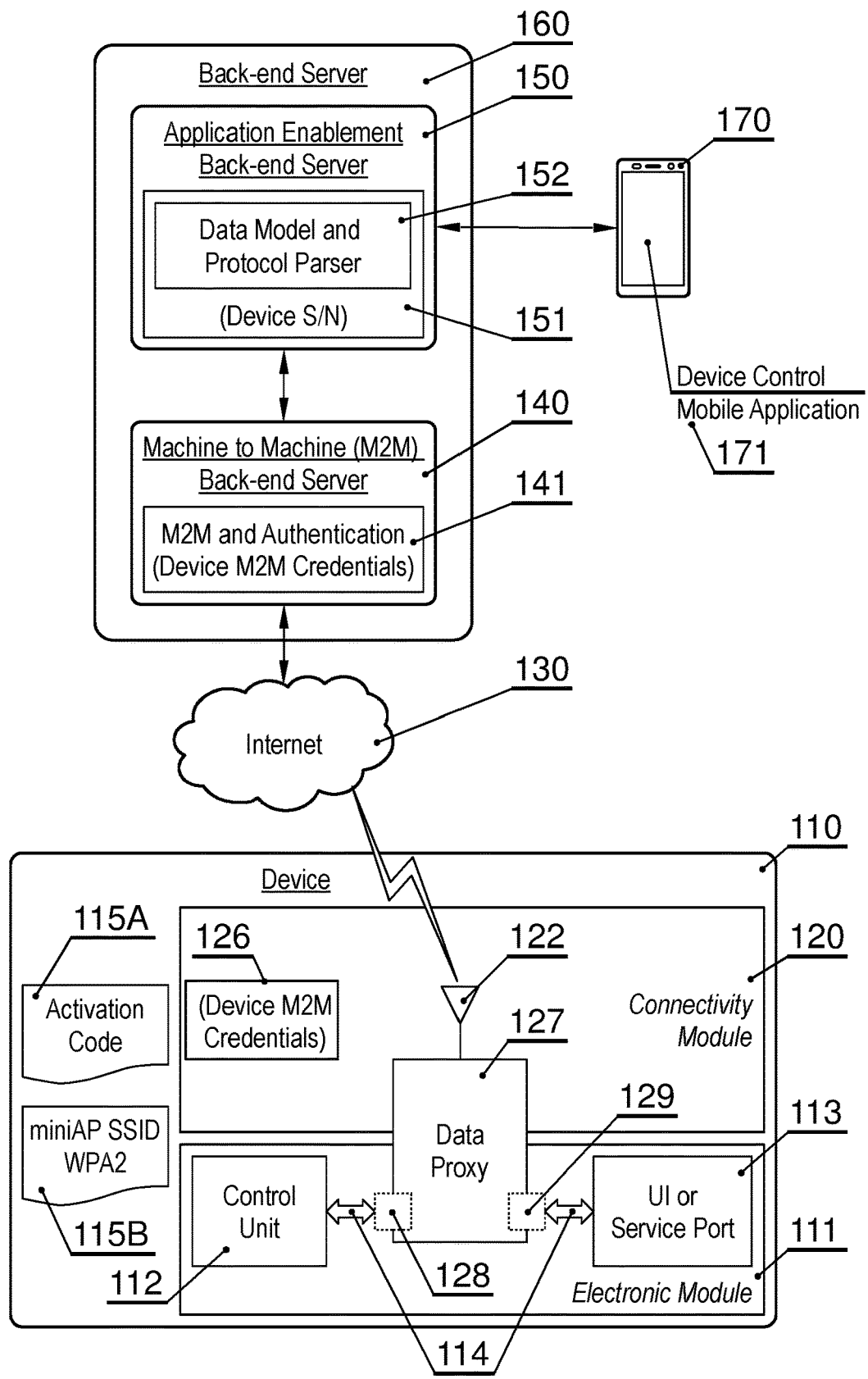
FIG. 2 presents a new approach to adding communication capabilities to an IoT device.

The structure of the improved device is shown in FIG. 2.

Usually, the legacy electronics of a device are composed by different physical parts, such as a main control unit module 112 (e.g. working as power/motor controller), by a user interface module 113 for enabling the user in controlling the device settings (such as the control panel of a washing machine) and/or by a service port module 113 for enabling service debug (such as for a local repair service).

Usually, these electronics modules are connected through an internal communication bus 114 (usually, a digital bus such as UART or I2C or USB or others) for exchanging messages, such as data and command messages. This internal communication bus 114 can be physical/logical dissected in order to get the in and out messages and proxy all the messages to/from the cloud through the client, by incorporating therein a data proxy module 127.

For example, the data proxy module 127 can be connected with the electronic module 111 simply interconnecting the communication bus and rely on its multi node capabilities and configuring the data proxy module 127 as an additional bus node (such as for an I2C or other type of Wired-QR bus), or by dissecting the bus with ad-hoc bidirectional input/output ports of the data proxy module 127 able to get the data and replicate seamless (such as for UART or other point-to-point serial bus type) or by simply connecting the service port of the device also providing a second port reply.

The data proxy module 127 can be realized by means of embedded hardware and software capabilities of the connectivity module 120 itself or it can be implemented as add-on interface module between the communication bus 114 and the connectivity module 120 in order to preserve the generic hardware and software implementation of connectivity module 120, that is primary designed in order to be reused for different communication bus technologies.

The messages transmitted via the internal bus 114 are usually binary frames, whose data-protocol and data-model are custom and device-specific.

The improved device as presented herein uses a pretty piggyback approach that does not need to modify the legacy hardware/software designs of the legacy electronics 111 of the device and requires just to insert the connectivity module 120 over the internal communication bus 114.

Figure 3A:
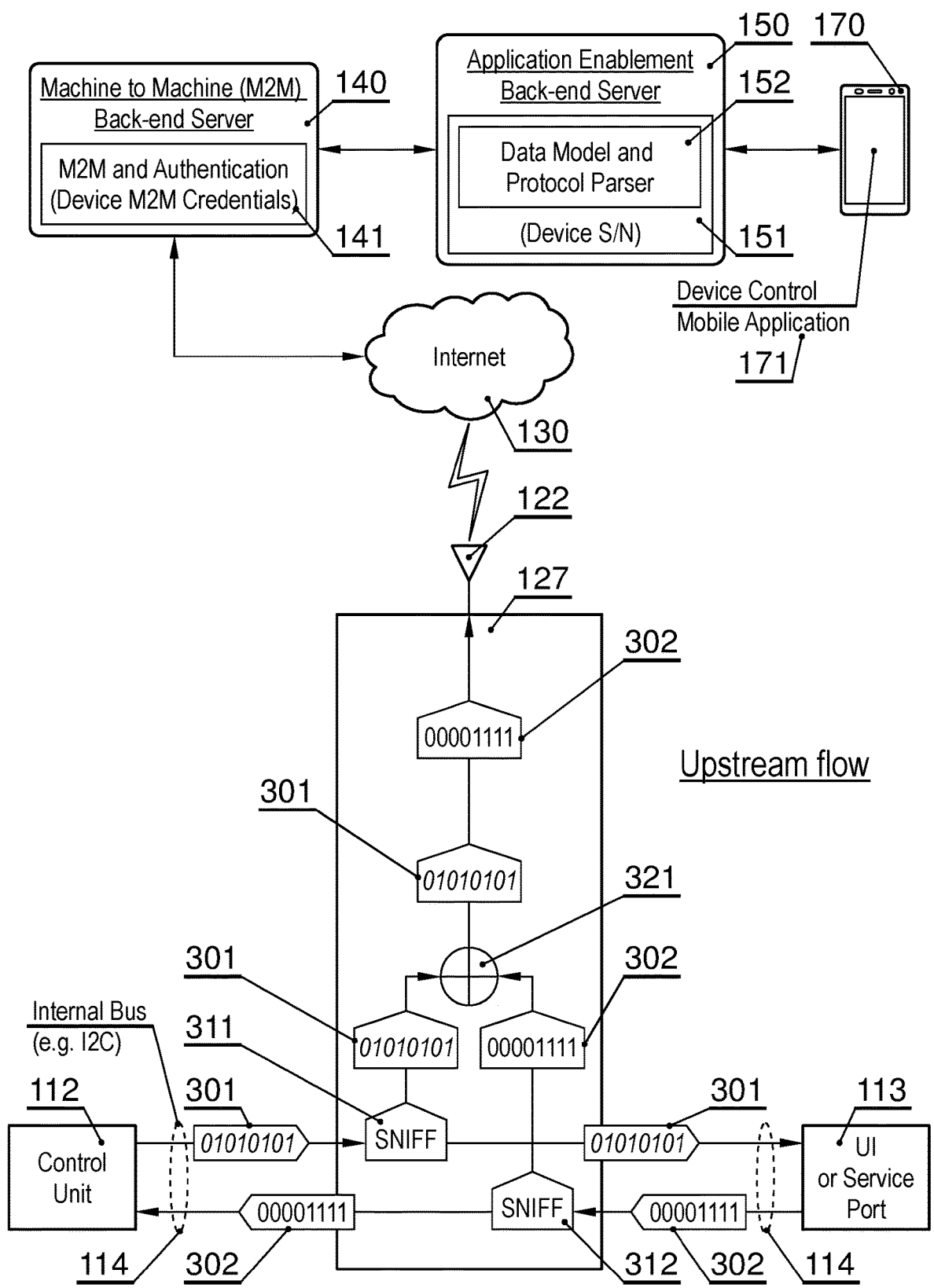
FIGS. 3A and 3B present data flow in the device and system of FIG. 2.
Figure 3B:
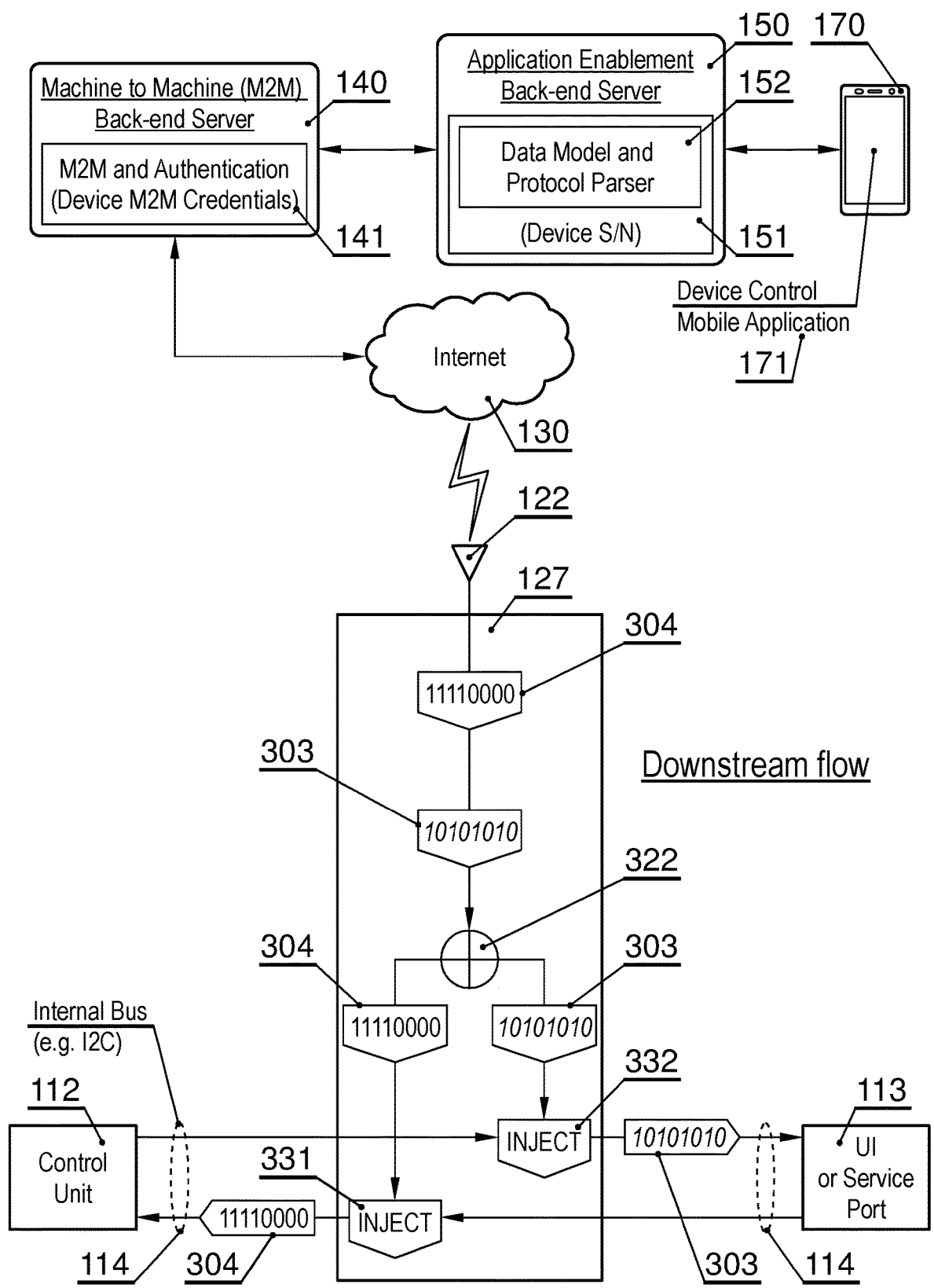

This piggyback approach does not need to have a local on-board knowledge of the messages data protocol and data-model, but it works as an agnostic proxy 127 sending/receiving transparently all the binary messages in a row format to/from the cloud in upstream and downstream direction, as shown in FIGS. 3A and 3B.

The proxy module 127 comprises a first sniffing module 311 that monitors data transmission 301 from the control unit 112 to the communication interface 113 (UI or service port), and a second sniffing module 312 that monitors data transmission 302 from the communication interface 113 (UI or service port) to the control unit 112. Any data that is transmitted over the communication bus 114 is multiplexed by a multiplexer 321 and transmitted upstream by a data interface 122 via the Internet 130 to the M2M back-end server 140 in the cloud. The data interface 122 can be a wireless interface, e.g. a Wi-Fi interface.

A message parser 152 is located in the cloud, that knows the specific device data-protocol and data-model and can decode all the device data-protocol and model.

In case of a downstream direction, any data transferred downstream by a data interface from the cloud is demultiplexed by the demultiplexer 322, that may operate e.g. by analyzing the destination addresses (node addresses) of the messages. In that case the proxy module 127 utilizes a first injecting module 331 that inputs the data transmission 304 from the could to the control unit 112, and a second injecting module 332 that inputs the data transmission 303 from the cloud to the communication interface 113 (UI or service port).

This approach avoids the addition of specific hardware/software capabilities at the legacy electronics 111 of the device. There is no need to add capabilities to the control unit module 112 or to the user interface/service port module 113 for being able to manage the appropriate communication data (send/receive the appropriate data message) with the appropriate data-model and data-protocol.

This approach avoids having a custom software running locally on the device and able to recognize the specific data-protocol and data-model of the device.

The piggyback approach is based on a pure transparent software proxy 127 and the device-specific data-protocol and data-model intelligence is virtualised in the cloud.

The device described with reference to FIGS. 2, 3A, 3B can utilize an improved activation procedure as described below.

Figure 1:
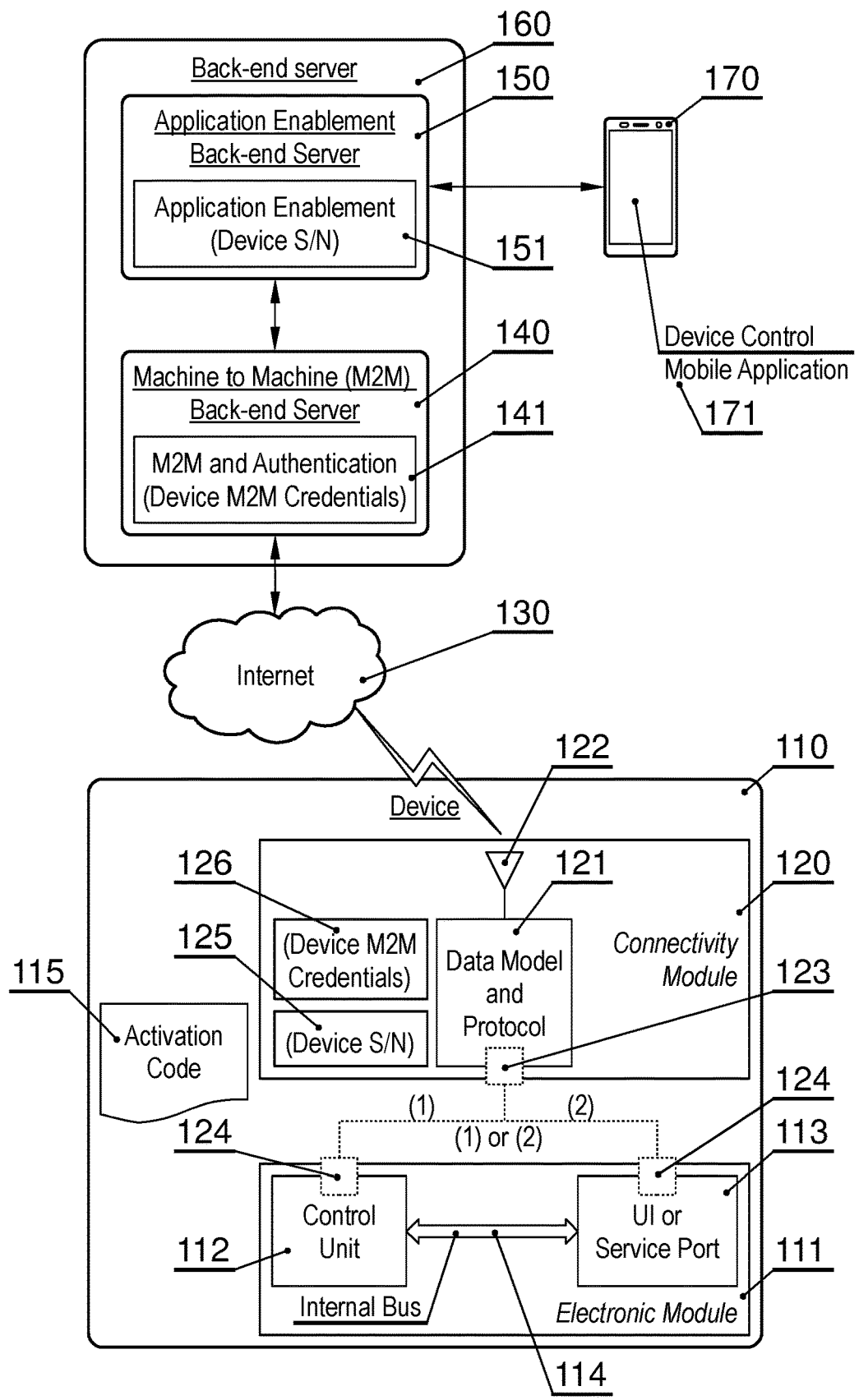
FIG. 1 presents a typical prior art IoT device having additional connectivity module that adds communication capabilities.

Typically, for a device such as described with reference to FIG. 1 in the background section, it is common that the procedure for activating a new connected device with its in-cloud M2M and application enablement back-end servers involves the following phases:

mutual authentication of the device with its back-end using the device M2M credentials, usually a unique physical client ID (such as the MAC address of the connectivity module) in order to establish the unique M2M connection with the M2M back-end server and a unique authentication ID (such as a pair of username/password or a unique client certificate) in order for the device to be authenticated by the M2M back-end server;

identification of the device by the application enablement back-end server using the device S/N ID that is a unique production ID, identifying that vendor, category, model and production unit used by the application enablement back-end server for recognizing the remote device unit and to control the device and send/receive data with.

The improved activation procedure makes a specific use of the device M2M credentials 126 (such as the client ID and authentication ID) and device S/N ID and relates to the particular manner of how these IDs are provisioned locally on the device during the manufacturing phases and in the cloud for the M2M and application enablement servers usage.

The client ID is a unique physical ID related to the connectivity module 120, such as the MAC address of the connectivity module 120. It is stored on the connectivity module in an ad-hoc electronic register 126 and it is written during the connectivity module manufacturing in the connectivity manufacturing modules factory (Factory 1 401). The client ID must be unique for the connectivity module 120 (such as its MAC address) for serving the M2M connectivity. There is no need to store the list of client IDs of the produced connectivity modules 120 during the manufacturing procedure in Factory 1 and there is no need to provision the list of client IDs in the cloud.

The authentication ID is based on a unique client SSL/TLS (Secure Socket Layer/Transport Layer Security) certificate as specified in the mutual authentication procedure of the SSL/TLS standard based on a unique private key and related public key. The unique TLS/SSL client certificate is pre-generated and stored on the connectivity module 120 in an ad-hoc electronic register 126 and it is written during the connectivity module manufacturing in the connectivity manufacturing modules factory (Factory 1). There is no need to store the list of TLS/SSL certificates of the produced connectivity modules 120 during the manufacturing procedure in Factory 1 and there is no need to provision the list of the TLS/SSL certificates in the cloud.

The device S/N ID is a unique production ID of the device, identifying e.g. the vendor, category, model and production unit. The device S/N ID does not have to be written in any electronic register (firmware/one-time programmable (FW/OTP) register), neither on the device legacy electronic module, nor on the connectivity module during any manufacturing procedure of the device manufacturing or connectivity module manufacturing. The device S/N ID can be printed as a string or QR code label 115A to be attached at the device chassis, even in the user-friendly format of an Activation code. There is no need to store the S/N IDs list of the produced devices during the manufacturing procedure in Factory 2 501 and no need to provision the list of the S/N IDs in the cloud.

Figure 4:
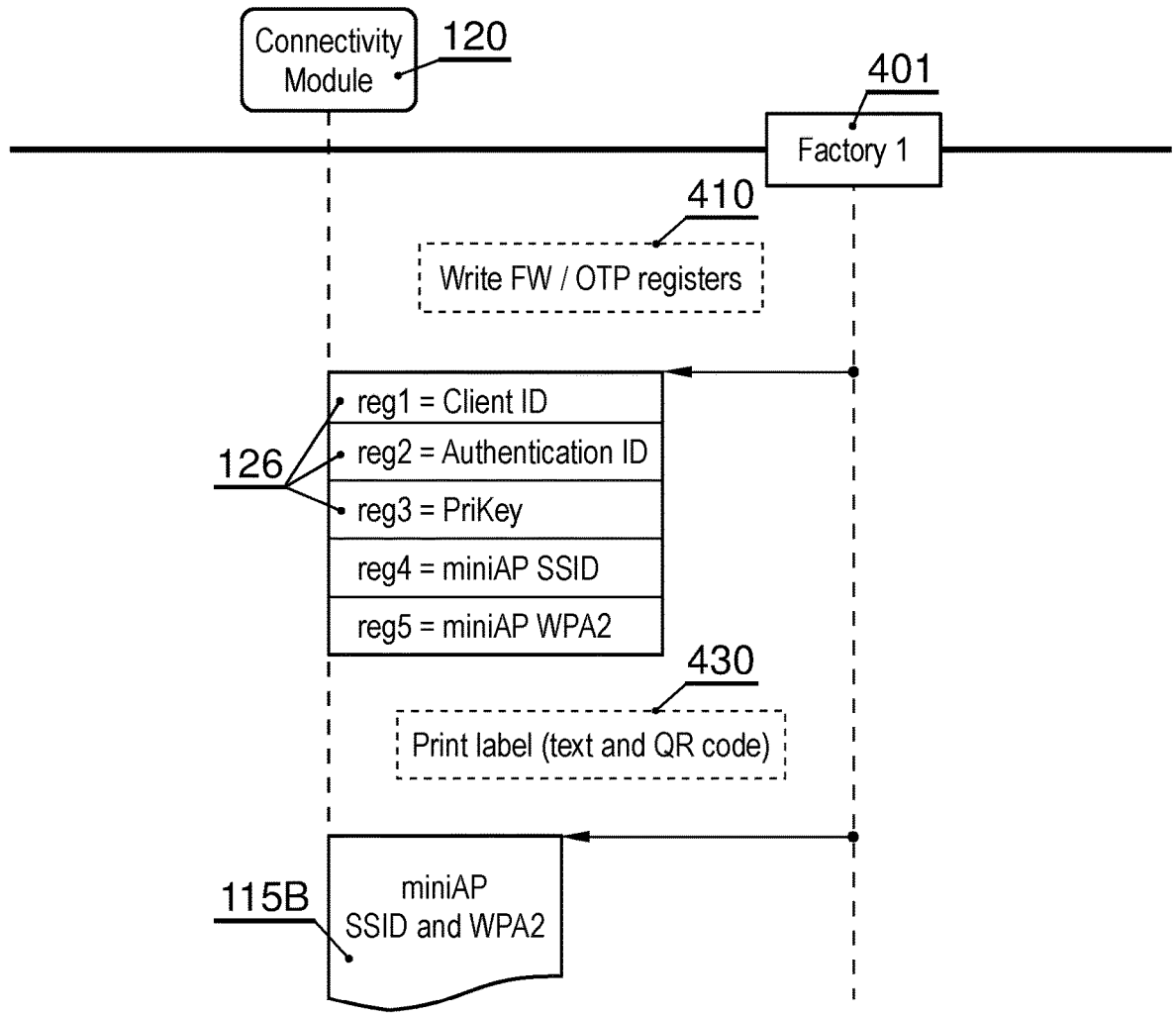
FIG. 4 presents data that must be generated and stored in step 410 on-board in firmware registers during the connectivity module manufacturing.

The connectivity module 120 is stand-alone produced before the device assembly and can be produced in a different factory than the factory in which the device is assembled, FIG. 4 shows the data that must be generated and stored in step 410 on-board in firmware registers 126 during the connectivity module 120 manufacturing, in order to be used later for the device activation procedure, include the credentials 141:

client ID (e.g. a MAC Address);
Topix Prefix ID (adbiot/tenantID/subtenantID)—for example in a case of MQTT M2M connection protocol to M2M cloud server;
M2M Cloud Address (e.g. a URL address);
miniAP SSID (e.g. a subtenant-last 3 byte MAC);
miniAP WPA2 (e.g. a hash of the MAC);
TLS client Certificate (e.g. a name, Public Key, validity period, etc);
TLS Private Key, The miniAP SSID and miniAP WPA2 are examples of implementation of the invention for communication over Wireless Protected Access (WPA, WPA2). Therefore, miniAP SSID is a specific example of a wireless client access point identifier, by which it can temporary work as an access point (mini Access Point), such as at the first power-on just for enabling the end-user device to connect and configure the client credentials for the user's wireless network miniAP WPA2 is an example of a wireless encryption key. The Client WiFi credentials are the SSID and the WPA2 that are the name and the encryption key of the user's wireless network.

For every client unit produced, a label is printed in step 430 (both in a text and QR code forms) reporting the miniAP SSID and miniAP WPA2. Each label 115B should be included in each connectivity module 120 package for later assembly with device.

Figure 5:
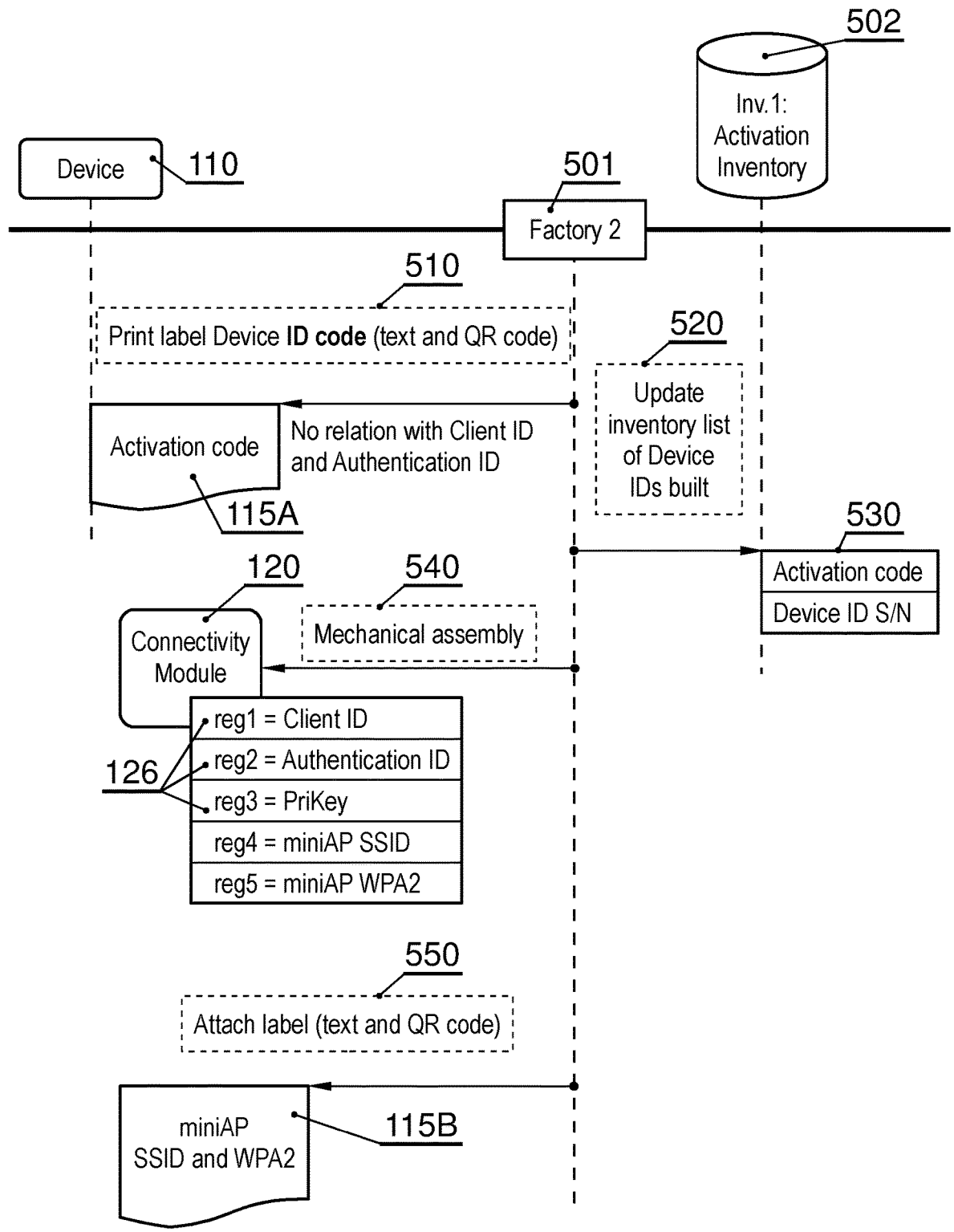
FIG. 5 presents the later device manufacturing.

FIG. 5 shows the later device manufacturing, wherein the client is just mechanically assembled, without need of probing the client and/or the device mother-board with specific tools (in factory PC and connector cabling). At every device unit produced, a label 115A is printed in step 510 (both in text and QR code forms) reporting the activation code. At every device unit produced with its unique activation code, the generated activation code should be stored in step 520 in an activation codes inventory database 502 during the manufacturing procedure as a record 530 along with the device S/N ID for then be provisioned to the cloud for serving the device activation procedure back-end side. After the connectivity module is assembled to the device in step 540, the activation code label 115A and the client miniAP SSID/WPA2 label 115B are attached in step 550 on the front panel of the device for easy accessing for the user.

Figure 6:
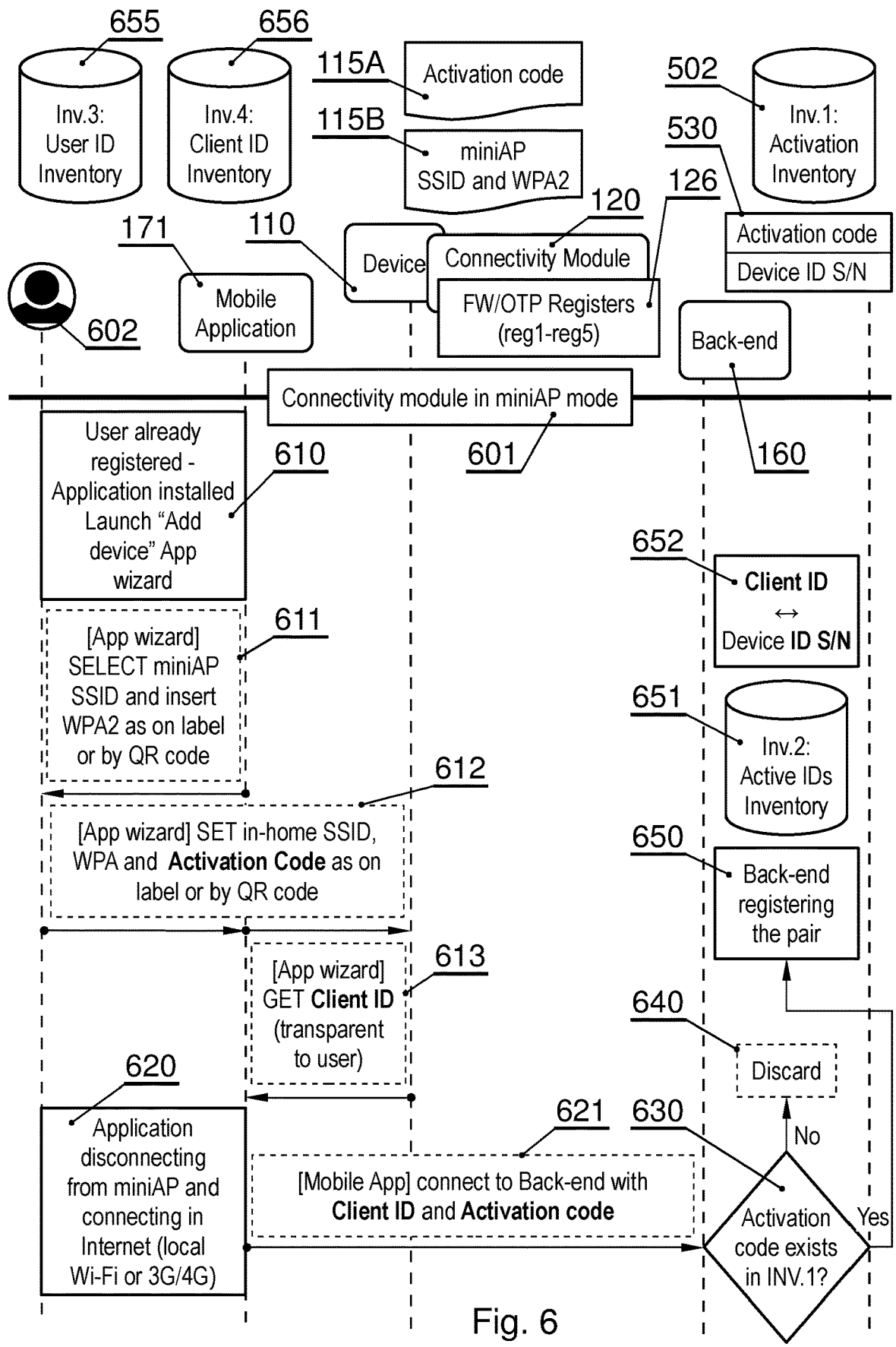
FIG. 6 presents the process of the first power-on of the device at the end-user's premises.

FIG. 6 shows the process of the first power-on of the device at the end-user's premises. The device is provided to the user 602 with the labels 115A, 115B. During the first power-on at the user's premises, the device is run into a miniAP mode in step 601. The user 602 should have already installed the connected device mobile application 171 in step 610 and be already registered in the system (by registering the User ID in the Users ID inventory database 655). Then, the user launches the "Add device" wizard in step 611.

The Wizard May Request the User:
- to select the device miniAP SSID as written on the label or by QR code and to input the miniAP WPA2 as written on the label or by QR code, in step 611;
- to input the activation code as written on the label or by QR code in step 612;
- to input the in-home wireless network SSID and WPA (or WPA2).

The wizard transparently obtains the client ID of the connectivity module in step 613.

After having applied by the user, the wizard commands a device change state to STA (Station) mode.

Then, the mobile application initiates the first connection to the cloud system.

The mobile application disconnects the miniAP and connects to The Internet by the in-home wireless network (e.g. Wi-Fi) or in 3G/4G connection in step 620.

As soon as the mobile application is connected to the cloud server 160, it sends the "Add device" message, reporting the new client ID <-> activation code pair in step 621.

The cloud verifies in step 630 whether in the incoming "add device" message of the application:
- the user ID is valid and present in the users inventory database 655;
- the client ID is valid as it has been transported by a valid mutual SSL/TLS client certificate;
- the activation code is valid and present in the activation codes inventory database 502;
- the user ID, client ID and activation code have not yet been associated in an active identifiers inventory database 651;

If so, this new client ID—activation code (or device ID S/N) pair 652 is stored in the active identifiers inventory database 651 and associated to this user ID in step 650.

The message is discarded in step 640:
- if the User ID is not valid or not present in the users inventory database 655;
- if the client ID is not valid because it has been transported by a not valid mutual SSL/TLS client certificate;
- if the activation code is not valid or not present in the activation codes inventory database 502.

If the incoming pair of client ID—activation code (or Device ID S/N) is already present in the active identifiers inventory database 651 then:
- if the incoming user ID is the current user ID associated with that device in the active identifiers inventory database 651, then no action has to be done (the same user has launched again the activation procedure on a device that has been already activated by the same user);
- if the incoming user ID is different than the user ID currently associated in the active identifiers inventory database 651 with the device, then an error can be issued if no new additional User ID can be allowed to be associated with that device.

If the activation code and the user ID are valid and present in the activation codes inventory database 502, and already associated to a current client ID, then:
- if the incoming client ID is the same as the current client ID associated with that device in the active identifiers inventory database 651, then no action has to be done (the user has launched again the activation procedure on a device already activated by that user);
- if the incoming client ID is valid (as it has been transported by a valid mutual SSL/TLS client certificate) but different than the current client ID associated with that device in the active identifiers inventory database 651, then it means a client replacement has been performed—then the current client ID (old) is replaced by the incoming one (new) in the activation codes inventory database.

If the client ID and the user ID are valid and already associated to a current activation code in the active identifiers inventory database 651, then:
- If the incoming activation code is the same as the current activation code, then no action to do (the user has launched again the activation procedure on a device already activated by that user);
- If the incoming activation code ID is valid (present in the activation codes inventory database 502), but different than the activation code currently associated with the client ID, then the "add device" message is discarded (as it can relate to a case of use of many devices of the same vendor owned by the same user).

There are therefore two, three or four inventory databases that can be utilized in the system:
- Inv.1: activation codes 502—generated during manufacturing procedure in factory and then provisioned in the back-end server 160;
- Inv.2: active identifiers inventory database 651—an internal database at the back-end server 160 that records which activation IDs have been already activated by the device activation procedure;
- Inv.3: user identifiers inventory database 655 (optional)—generated in the back-end server 160 before the device activation procedure;
- Inv.4: client identifiers inventory database 656 (optional)—generated in the back-end server 160 before the device activation procedure.

The system does not require to generate a database of client identifiers during the manufacturing procedure in the factory nor in the back-end server: the validation of the client ID is done on the fly: the incoming client ID is valid if it is transported by a valid SSL/TLS client certificate. The database of client identifiers 656 can be generated optionally in the back-end server for valid client identifiers, i.e. those that have been transported by a valid mutual SSL/TLS client certificate.

The SSL/TLS client certificates stored onboard of the device during the manufacturing procedure in the factory do not need to be stored in any factory inventory database to be then provisioned in the back-end server: each SSL/TLS client certificate is validated by the SSL/TLS server in the back-end according to the SSL/TLS standard.

Figure 7:
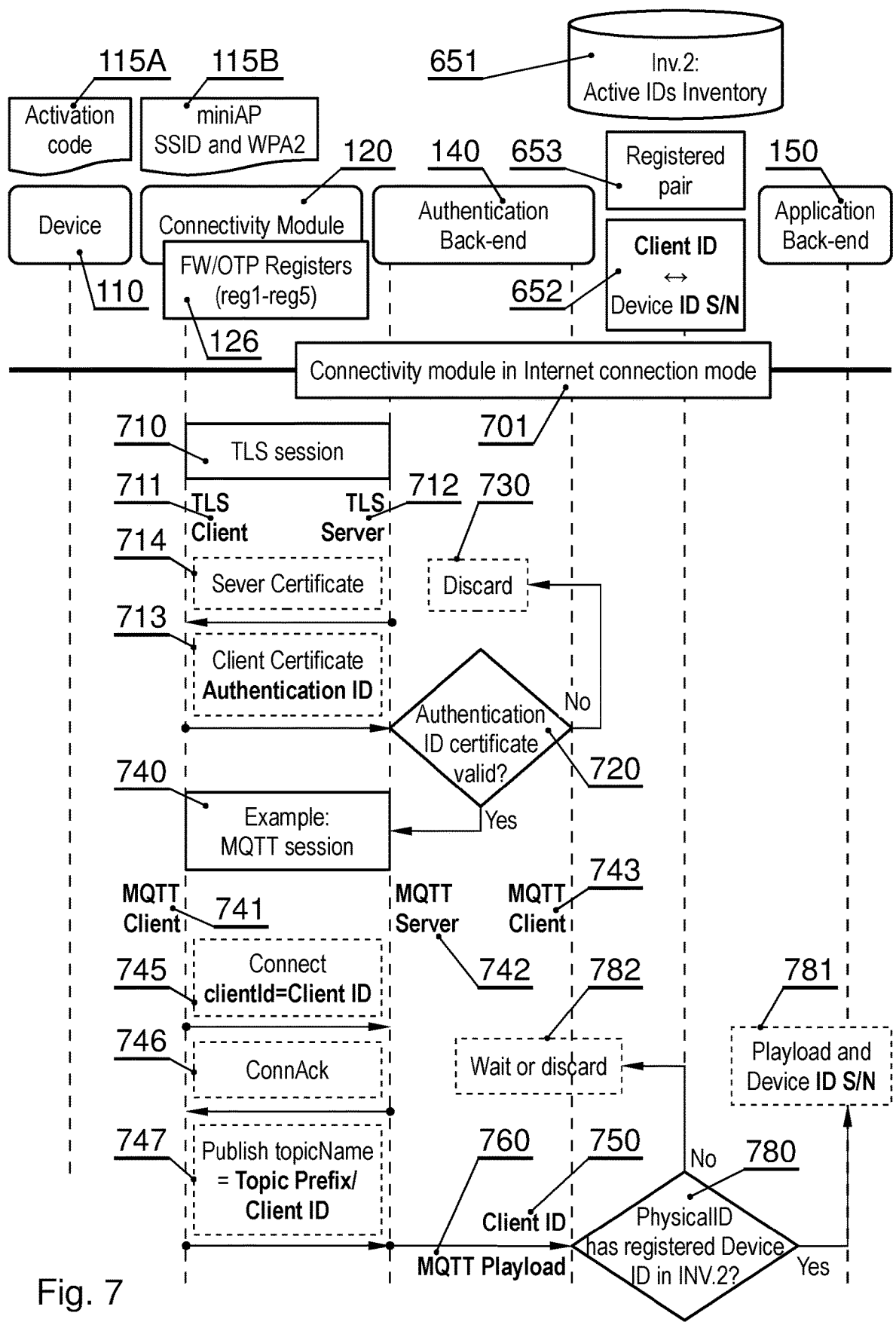
FIG. 7 presents the process of the first power-on of the device at the user's premises in the STA mode.

FIG. 7 shows the process of the first power-on of the device at the user's premises in the STA mode. When the device goes into the STA mode, it is connected to its cloud.

First, during the SSL/TLS session in step 710:
- the connectivity agent 711 starts an SSL connection with the SSL server 712;
- the server requires the client certificate;
- the agent certificates the SSL server by receiving its certificate 714;
- the server certificates the SSL client of the agent by receiving its certificate 713.

If the authentication ID certificate is considered as valid in step 720, the MQTT session is initiated in step 740, and it is discarded otherwise in step 730.

During the MQTT (Message Queuing Telemetry Transport) session:

the agent send its first Connect message 745 using client ID (MAC) as MQTT clientId and receive a connection acknowledgement (ConnAck) 746;

the agent sends a publish (Pub) message 747 using a topic with a prefix and client D.

The MQTT broker propagates to device API the payload 760 of the MQTT message along with the client ID 750 (e.g. the MAC address).

The device API checks 780 if the client ID exists as a registered pair 653 in an active identifiers inventory database 651 and has associated an activation code:

If the client ID does not exist in the client identifiers database 656, the message is discarded in step 782;

If the client ID exists in the client identifiers database 656, but the activation code is not yet associated with that client ID in the active identifiers inventory database 651, the message is discarded (the application has not sent yet the "add device" message) in step 782;

if the client exists and has an activation code paired in the active identifiers inventory database 651, then the payload and activation code are passed to higher level (such as toward the Binary Parser) in step 781.

Figure 8A:
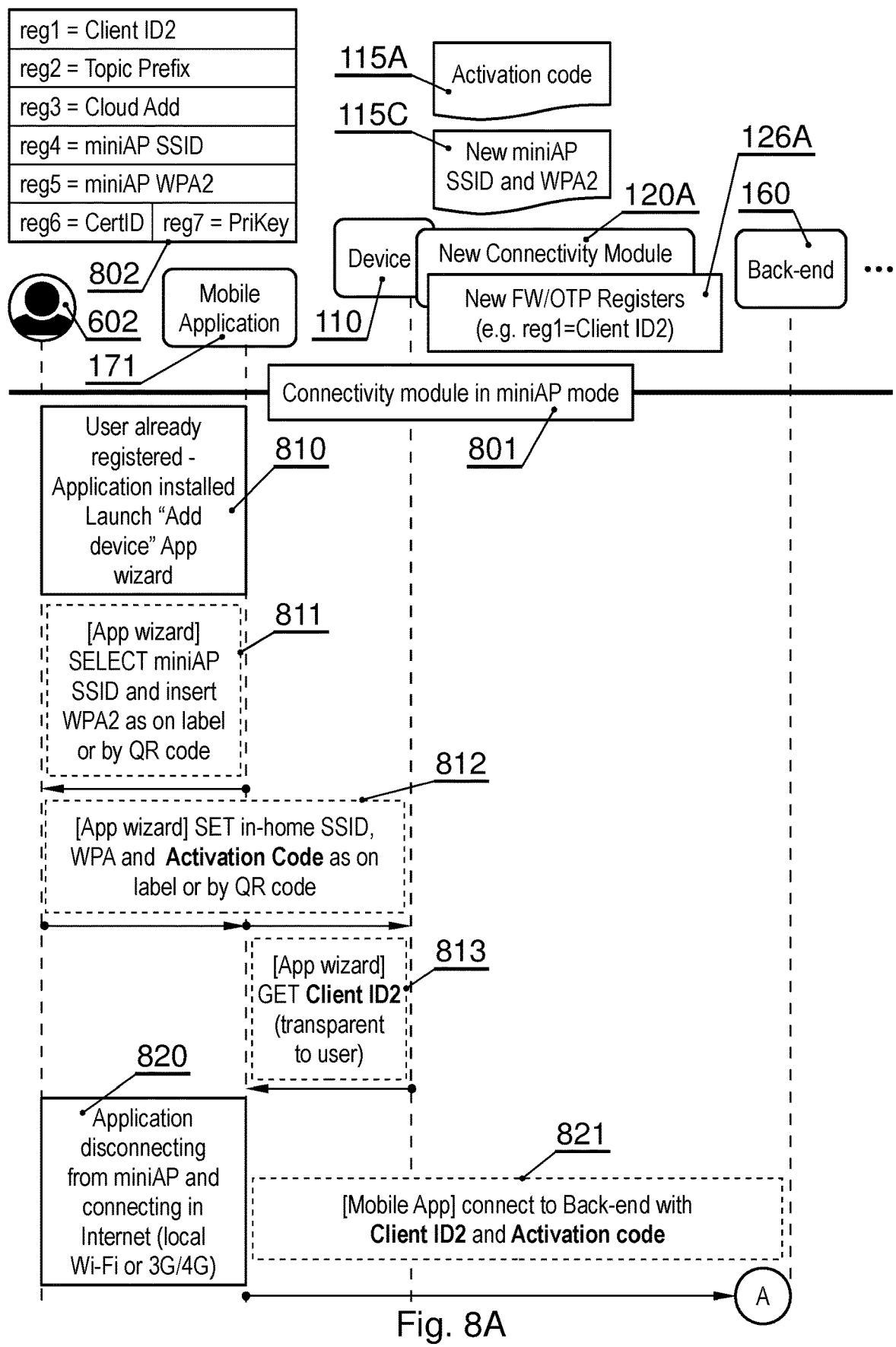
FIGS. 8A, 8B present the process of client replacement at user's premises.
Figure 8B:
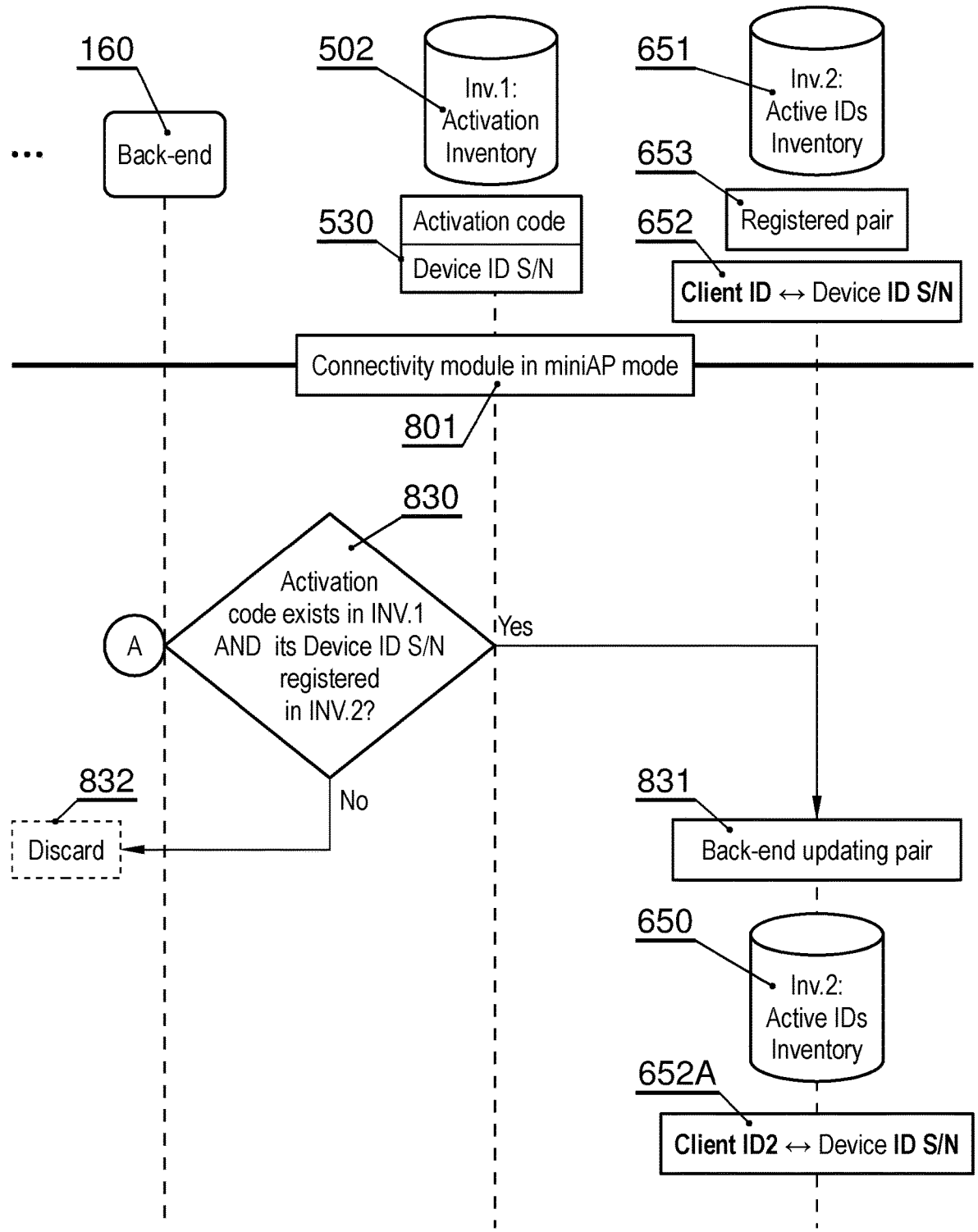

FIGS. 8A, 8B show the process of client replacement at user's premises. In case of need of client replacement, the "Add device" procedure must be repeated in order to associate the new client with the already activated device. When the new client is powered-on for the first time, it goes into the miniAP mode in step 801. The user has to launch the "Add device" wizard in step 810.

This wizard requests to the user:

to select the device miniAP SSID as written on the new label 115C or by new QR code and to input the miniAP WPA2 as written on the new label 115C or by new QR code in step 811;

to input the activation code as written on the old device label 115A or by old device QR code in step 812;

to input the in-home wireless network SSID and WPA.

The wizard transparently gets the new client ID in step 813.

After having applied by the user, the wizard commands a device change state into STA mode.

The mobile application disconnects the miniAP and connects to the Internet by the in-home wireless network or in 3G/4G connection in step 820.

As soon as the mobile application is connected to the cloud server 160, it reports the "Add device" message with the new client ID <-> old activation code pair 821.

The cloud server 160 verifies whether the User ID and client ID, activation code are valid (present in the databases) in step 830. If not, the message is discarded in step 832. If so, the cloud verifies whether the User ID and activation code is already coupled with an existing client ID and the existing client ID (old) is replaced by the new client ID 652A.

The presented solution, depending on the number of implemented functionalities as described above, has at least one of the following advantages.

The solution can be used to improve the functionality of devices that have a legacy electronic control unit without any Internet connectivity capability and based on approved and certified hardware and software, which does not have to be modified—only the new connectivity module 120A has to be added to the device.

The generic connectivity module does not have to store any data related to the hosting device and/or does not have to be able to exchange proprietary data with the device.

The connectivity module is universal and reusable for various types of devices.

There is no need to store the device ID S/N on the connectivity module or on the mother-board and no need to have device ID S/N exchanged between the mother-board and the connectivity module.

The connectivity module can get all the data from the mother-board in a transparent raw mode, that means the connectivity module does not have to know any communication protocol of the device mother-board, but just get the raw data (bit stream) and send to the cloud for later parsing and decoding.

In case of connectivity module replacement, there is no need to configure any ID parameter on-board.

An SSL/TLS client certificate can be used for on-the-fly authentication of the device by the back-end without the need of managing a connectivity ID inventory database during manufacturing and then provisioning to back-end.

The presented method and system allow to limit the legacy electronic module redesign and customization of the connectivity module design. This has been achieved by preserving a large portion of the legacy electronic module design of the device, and limiting the hardware/software modifications. There are no major modifications of the legacy control unit module or of the user interface/service port module.

There has been implemented a generic connectivity module hardware/software design, in order to be as much as possible agnostic to the legacy device and reusable in a multi-things approach. As a result, the same connectivity module can be reused for many categories of devices.

The piggyback board design of the connectivity module with simple messages software proxy in the cloud allows the device data-model and protocol to be parsed in the cloud.

The connectivity module is designed in order to proxy in the cloud the internal bus messages of the device in a blind way, without the need to know the device info. There is no need of using locally any device S/N ID and no need to know the legacy electronic module data model and data protocol.

Moreover, the connectivity module manufacturing and device assembly procedures have been simplified. There is no need to provide in factory the ad-hoc device S/N ID of the legacy device storing it in an electronic register on the legacy electronic module or on the connectivity module during manufacturing procedures. The connectivity module manufacturing and device assembly are decoupled. The connectivity module firmware/software is generic and does not have any custom info related to the hosting device. The connectivity module firmware/software is preloaded in the connectivity module factory (i.e. the first factory) with unique, but generic device M2M credentials not related to the hosting device. The connectivity module is designed to be single firmware/software device data-model and data-protocol agnostic. The connectivity module is assembled in the device factory (i.e. the second factory) in a passive way, without need to store ad-hoc data on-board and so without need to probe any in-factory programming tool during the manufacturing and assembly procedures of the device.

In addition, provisioning of the IDs inventories on the back-end side is simplified.

The manufacturing procedures have been simplified by:
avoiding manufacturing step 1.c in the first factory;
avoiding manufacturing step 1.d in the second factory and related inventories management in the cloud;
avoiding manufacturing step 2.b in the second factory;
avoiding manufacturing step 2.c in the second factory;

avoiding manufacturing step 2.d in the second factory and related database inventory database management in the cloud.

The above is particularly useful when the connectivity module comprises a wireless client, e.g. a Wi-Fi client.

There is no need to change or modify the original electronics of the device, which is usually based on a legacy hardware/software design. Instead, the new connectivity module 120A with its add-on hardware/software connectivity features is added to the device. For example, a standard appliance (such as a legacy washing machine) can become smart-connected and able to exchange its data in the Internet (with the vendor back-end and with the user control application) just by assembling a wireless client (such as a Wi-Fi client module), without modifying the legacy electronics of the device.

It can be easily recognized, by one skilled in the art, that the aforementioned methods may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A device comprising:
an electronic module including:
   a control unit,
   a communication interface, and
   a communication bus having multiple bus nodes and communicatively coupling the control unit to the communication interface;
a connectivity module having a hardware and software implementation and configured to provide Internet connectivity for the device via a wireless data interface communicatively connected with the electronic module, the connectivity module including a register comprising data related to machine-to-machine credentials and comprising: a unique client identifier, an authentication identifier related to a unique pair of public/private encryption keys, a wireless client access point identifier, and a wireless encryption key;
a data proxy module connected between the wireless data interface of the connectivity module and the communication bus of the electronic module for transmitting data between the wireless data interface and the communication bus, wherein the data proxy module is implemented as an add-on interface module between the communication bus and the connectivity module so as to preserve the hardware and software implementation of the connectivity module, and wherein the data proxy module is connected with the electronic module by interconnecting with the communication bus and configuring the data proxy module as an additional bus node of the communication bus, and wherein the data proxy module includes:
   a first sniffing module configured to read data transmitted via the communication bus from the control unit to the communication interface,
   a second sniffing module configured to read data transmitted via the communication bus from the communication interface to the control unit,
   a multiplexer configured to multiplex data read by the first sniffing module and the second sniffing module and to transmit the multiplexed data to the wireless data interface,
   a first injecting module configured to transmit data via the communication bus to the control unit,
   a second injecting module configured to transmit data via the communication bus to the communication interface, and
   a demultiplexer configured to read data from the wireless data interface and to demultiplex and transmit data to the first injecting module and to the second injecting module; and
a first non-electronic label associated with the electronic module and comprising an activation code unique for the device, and a second non-electronic label, different from the first non-electronic label, associated with the connectivity module and comprising the wireless client access point identifier and the wireless encryption key.

2. A system comprising:
at least one device according to claim 1; and
a back-end cloud server comprising:
   a machine-to-machine server configured to communicate with the connectivity module of the at least one device;
   an application enablement server connected with the machine-to-machine server and configured to handle communication between the at least one device and an end-user device, and
   an activation codes inventory database comprising pairs of data related to the activation code and an associated device serial number of the at least one device.

3. The system according to claim 2, further comprising: an active identifiers inventory database comprising pairs of a client identifier and a device serial number or activation code.

4. A method for providing an IoT functionality to a device including an electronic module, a connectivity module, a data proxy module, a first non-electronic label, and a second non-electronic label, the electronic module including a control unit, a communication interface, and a communication bus having multiple bus nodes and communicatively coupling the control unit to the communication interface, and the connectivity module having a hardware and software implementation and configured to provide Internet connectivity for the device via a wireless data interface communicatively connected with the electronic module, the connectivity module including a register comprising data related to machine-to-machine credentials and comprising: a unique client identifier, an authentication identifier related to a unique pair of public/private encryption keys, a wireless client access point identifier, and a wireless encryption key, and the data proxy module connected between the wireless data interface of the connectivity module and the communication bus of the electronic module for transmitting data between the wireless data interface and the communication bus, the data proxy module being implemented as an add-on interface module between the communication bus and the connectivity module so as to preserve the hardware and software implementation of the connectivity module, and the data proxy module being connected with the electronic module by interconnecting with the communication bus and configuring the data proxy module as an additional bus node of the communication bus, and the data proxy module including a first sniffing module configured to read data transmitted via the communication bus from the control unit to the communication interface, a second sniffing module configured to read data transmitted via the communication bus from the communication interface to the control unit, a multiplexer configured to multiplex data read by the first sniffing module and the second sniffing module and to transmit the multiplexed data to the wireless data interface, a first injecting module configured to transmit data via the communication bus to the control unit, a second injecting module configured to transmit data via the communication bus to the communication interface, and a demultiplexer configured to read data from the wireless data interface and to demultiplex and transmit data to the first injecting module and to the second injecting module, and the first non-electronic label associated with the electronic module and comprising an activation code unique for the device, and the second non-electronic label being different from the first non-electronic label and associated with the connectivity module and comprising the wireless client access point identifier and the wireless encryption key, wherein the method comprising:

manufacturing the device by:

providing the connectivity module and storing in the register data related to machine-to-machine credentials, providing the second non-electronic label associated with the connectivity module, providing the electronic module having a device serial number associated with the device, providing the first non-electronic label associated with the electronic module and comprising the activation code unique for the device, assembling the device by connecting the electronic module with the connectivity module, and providing a package comprising the device and the first and second non-electronic labels.

5. The method according to claim 4, further comprising: storing, in an activation codes inventory database at a back-end server, pairs of data related to the activation code and the associated device serial number, corresponding to the manufactured devices.

6. A method according to claim 5, further comprising: initiating operation of the device by:

receiving, using an application operated by an end-user device, from the end-user device the wireless client access point identifier and the wireless encryption key, receiving, using the application operated by the end-user device, from the end-user device the activation code, communicating, using the application operated by the end-user device, with the device using the wireless client access point identifier and the wireless encryption key and reading from the register of the connectivity module the client identifier, transmitting, using the application operated by the end-user device, to the back-end server data related to the client identifier and the activation code, and registering, at the back-end server, the device upon verifying the existence of the activation code in the activation codes inventory database.

7. The method according to claim 6, further comprising: registering a pair of a client identifier and a device serial number or activation code in an active identifiers inventory database at the back-end server.

8. The method according to claim 7, further comprising: initiating the operation of the device in a Station mode, including: receiving from the device the activation code and the client identifier, and checking whether these identifiers are paired in the active identifiers inventory database.

\* \* \* \* \*